United States Patent Office 2,789,982
Patented Apr. 23, 1957

2,789,982
ALKANOL PYRIDINES AND PROCESS OF MAKING THEM

Francis E. Cislak, Indianapolis, Ind., assignor to Reilly Tar & Chemical Corporation, Indianapolis, Ind., a corporation of Indiana No Drawing. Application February 15, 1956, Serial No. 565,544

5 Claims. (Cl. 260—297)

This invention relates to alkanolpyridines and to the process of making them. More particularly, it relates to alkanolpyridines having the following general formula:

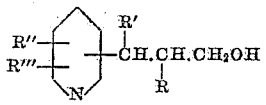

where R, R', R'', R''' represent hydrogen or alkyl.

In general, the compounds of my present invention may be prepared by reacting sodamide with a pyridine which has as a substituent the group —$CHR_1R_2$ (wherein $R_1$ and $R_2$ represent hydrogen or alkyl) and then reacting the resulting picolylsodium with an ethylene oxide having the general formula

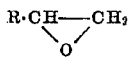

where R represents hydrogen or lower alkyl.

My invention will be described more fully in conjunction with the examples given below. It is to be understood, however, that these examples are by way of illustration only, and my invention is not to be limited by the details given therein.

EXAMPLE 1

*4-(1-propan-3-ol)pyridine*

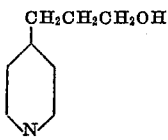

Forty grams of finely divided sodamide, prepared in any suitable manner, are dispersed in about 1,000 cc. of liquid ammonia. To this dispersion of sodamide in liquid ammonia is added about 93 grams (1 mol) of 4-picoline; the picoline is added in small portions to more readily control the reaction. After all of the picoline has been added, the mixture is stirred for about another one-half to one hour. Then about 44 grams (1 mol) of ethylene oxide is added in small portions. The reaction mixture is mechanically stirred during the addition of the ethylene oxide and is continued for from about two to six hours after all the ethylene oxide has been added. The 4-(1-propan-3-ol)pyridine formed during the reaction period is isolated in any suitable manner.

One way of isolating 4-(1-propan-3-ol)pyridine is as follows: The ammonia is evaporated. Methanol and water are added to hydrolyse any unreacted sodamide and the sodium derivative of the alkanol. Then hydrochloric acid is added to neutralize the resulting sodium hydroxide, care being taken not to add an excess of the hydrochloric acid. The neutral solution is extracted several times with 300 cc. portions of benzene; the benzene removes the alkanolpyridine from the aqueous solution. The 4-(1-propan-3-ol)pyridine is separated from the benzene by fractional distillation.

The pure 4-(1-propan-3-ol)pyridine boils at 289° C. (760 mm.). It has a freezing point of about 36.7° C.

The reaction in liquid ammonia may be carried out at atmospheric pressure or it may be conducted at superatmospheric pressures. Commercially, I prefer to use superatmospheric pressures of the order of 100 to 200 lbs./sq. in. I prefer to carry out the reaction at relatively low temperatures of from about —30° C. to about 50° C.

While I prefer to use sodamide, I can use other alkali amides. In place of my preferred liquid ammonia, I may use other reaction media, such as dimethylaniline, diethylether, or the like.

EXAMPLE 2

*2-(1-propan-3-ol)pyridine*

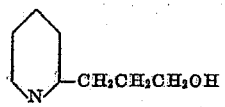

The procedure of Example 1 is followed with the exception that 2-picoline is used in place of the 4-picoline.

The 2-(1-propan-3-ol)pyridine when pure has a boiling point at 760 mm. Hg of about 260° C. Its index of refraction, D line sodium, at 20° C. is 1.5298.

EXAMPLE 3

*2-(1-propan-3-ol)-5-ethylpyridine*

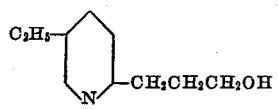

The procedure of Example 1 is repeated with the exception that 2-methyl-5-ethylpyridine is used in place of the 4-picoline.

EXAMPLE 4

*4-(1-propan-3-ol)-2,6-dimethylpyridine*

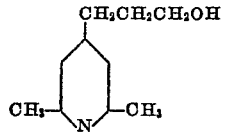

The procedure of Example 1 is repeated with the exception that 2,4,6-collidine is used in place of the 4-picoline.

EXAMPLE 5

*4-(2-butan-4-ol)pyridine*

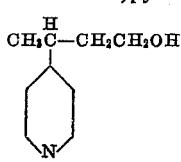

The procedure of Example 1 is repeated with the exception that 4-ethylpyridine is used in place of the 4-picoline.

EXAMPLE 6

*3-(1-propan-3-ol)pyridine*

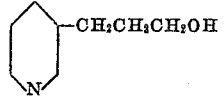

The procedure of Example 1 is repeated with the exception that 3-picoline is used in place of the 4-picoline. The 3-picoline does not react with the sodamide as rapidly nor as completely as does the 4-picoline. The yield of 3-(1-propan-3-ol)pyridine is considerably less than is the yield of 4-(1-propan-3-ol)pyridine from 4-picoline.

EXAMPLE 7

*4-(6-octan-8-ol)pyridine*

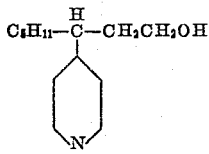

The procedure of Example 1 is repeated with the exception that 4-n-hexylpyridine is used in place of the 4-picoline.

The alkanolpyridines of this invention are important starting materials for the preparation of the alkanolpyridine-N-oxides which are the subject of U. S. Patent No. 2,735,851 issued February 21, 1956.

A process of preparing pyridyl glycols from the alkanolpyridines is the subject of a co-pending application of Cislak and McGill Serial No. 565,545 filed even date herewith.

I claim as my invention:

1. The process of preparing alkanolpyridines having the following general formula:

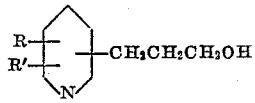

wherein R and R' are selected from the group consisting of hydrogen and alkyl which comprises the following steps: (1) preparing a dispersion of finely divided sodamide in liquid ammonia, (2) adding a picoline to the liquid ammonia dispersion of sodamide thereby causing the formation of a picolylsodium, (3) adding ethylene oxide to form a sodium derivative of a propan-3-olpyridine, and (4) recovering the propan-3-olpyridine.

2. The process of preparing 4-(1-propan-3-ol)pyridine which comprises the following steps: (1) adding 4-picoline to a finely divided sodamide dispersed in liquid ammonia to form 4-picolylsodium, (2) adding ethylene oxide to form the sodium derivative of 4-(1-propan-3-ol)pyridine, and (3) recovering the 4-(1-propan-3-ol)pyridine.

3. The process of claim 1 in which the picoline used is 2-picoline.

4. The process of claim 1 in which the picoline used is 3-picoline.

5. The process of claim 1 in which the picoline used is 2-methyl-5-ethylpyridine.

References Cited in the file of this patent

FOREIGN PATENTS 448,689      Belgium _____ Feb. 1943

OTHER REFERENCES

Grunwold: Chem. Abstracts, vol. 38, col. 6197 (1944).
Schick et al.: Chem. Abst., vol. 42, col. 7288 (1948).
Gilman et al.: Rec. Trav. Chim., vol. 69, pp. 428–32 (1950).